United States Patent [19]

Catignani

[11] 4,106,718
[45] Aug. 15, 1978

[54] SPINNING REEL SPOOL AND ADAPTER THEREFOR

[75] Inventor: Robert T. Catignani, Fort Lee, N.J.

[73] Assignee: The Garcia Corporation, Teaneck, N.J.

[21] Appl. No.: 757,208

[22] Filed: Jan. 6, 1977

Related U.S. Application Data

[63] Continuation of Ser. No. 85,620, Oct. 30, 1970, abandoned, which is a continuation of Ser. No. 746,936, Jul. 23, 1968, abandoned.

[51] Int. Cl.[2] ............................................. A01K 89/01
[52] U.S. Cl. ............................ 242/84.2 R; 242/118.4
[58] Field of Search ...................... 242/84.1 R, 84.2 R, 242/84.2 A, 84.21 A, 118.4, 84.2 B

[56] References Cited

U.S. PATENT DOCUMENTS

| | | | |
|---|---|---|---|
| 2,783,952 | 3/1957 | Clay | 242/84.21 R |
| 3,565,362 | 2/1971 | Lilland | 242/84.21 R |

FOREIGN PATENT DOCUMENTS

| | | | |
|---|---|---|---|
| 649,232 | 8/1928 | France | 242/84.2 B |
| 1,133,009 | 11/1956 | France | 242/84.2 B |
| 530,559 | 7/1965 | Italy | 242/84.1 R |
| 916,583 | 1/1963 | United Kingdom | 242/84.2 R |

*Primary Examiner*—Billy S. Taylor

[57] ABSTRACT

A conventional spinning reel has an adapter mounted on its spindle to receive a longitudinally symmetrical spool, the adapter holding the spool with adjustable friction tension against rotation and having clicking means to indicate rotation of the spool, the single symmetrical spool being suitable for mounting on both right and left hand spinning reels and being optionally disposable because of the simplified structure.

6 Claims, 6 Drawing Figures

SPINNING REEL SPOOL AND ADAPTER THEREFOR

This is a continuation of application Ser. No. 85,620, filed Oct. 30, 1970, and now abandoned, which was a continuation of pending application Ser. No. 746,936 filed July 23, 1968 and now abandoned.

BACKGROUND OF THE INVENTION

The well known MITCHELL 300 reel is a right hand spinning reel; the MITCHELL 301 is left hand. Sales information indicates that, for every ten MITCHELL 300 reels sold, one MITCHELL 301 reel is sold. Thus, for this item there is a sales ratio of ten to one of right hand reels to left hand reels.

Present pre-wound spools for these reels must be marked and wound right and left hand. Sales information indicates that only twenty-eight left hand pre-wound spools are sold out of each thousand pre-wound spools for these reels. One reason for the lag in expected sales of pre-wound left hand spools might be that tackle tradesmen are less willing to stock left hand pre-wound spools that they know will be relatively slow sellers.

Thus the advantage of a single pre-wound spool that can serve both right and left hand reels is obvious. However, such spools must fit existing reels without modification, function as well as existing spools in such reels, and be comparable or lower in cost than existing spools.

SUMMARY OF THE INVENTION

A conventional spinning reel has an adapter mounted on its spindle to receive a longitudinally symmetrical spool, the adapter holding the spool with adjustable friction tension against rotation and having clicking means to indicate rotation of the spool, the single symmetrical spool being suitable for mounting on both right and left hand spinning reels. The adapter has a flange which extends beyond the rearwardly disposed shoulder of the symmetrical spool to fill the annular space between this shoulder and the bail carrier.

Since pre-wound spools may be readily changed on the spindle adapter, several spools labeled as to pound test and yardage of line may be conveniently carried. The symmetrical spools of this invention, not requiring a large rear shoulder to fill the space up to the bail carrier, are smaller and thus take up less room to be more conveniently carried. Finally, the pre-wound symmetrical spools of this invention are less costly than conventional spools. They may be considered disposable or they may be used with other line if a user cares to rewind them.

DESCRIPTION OF THE PREFERRED EMBODIMENT

Figure 3:
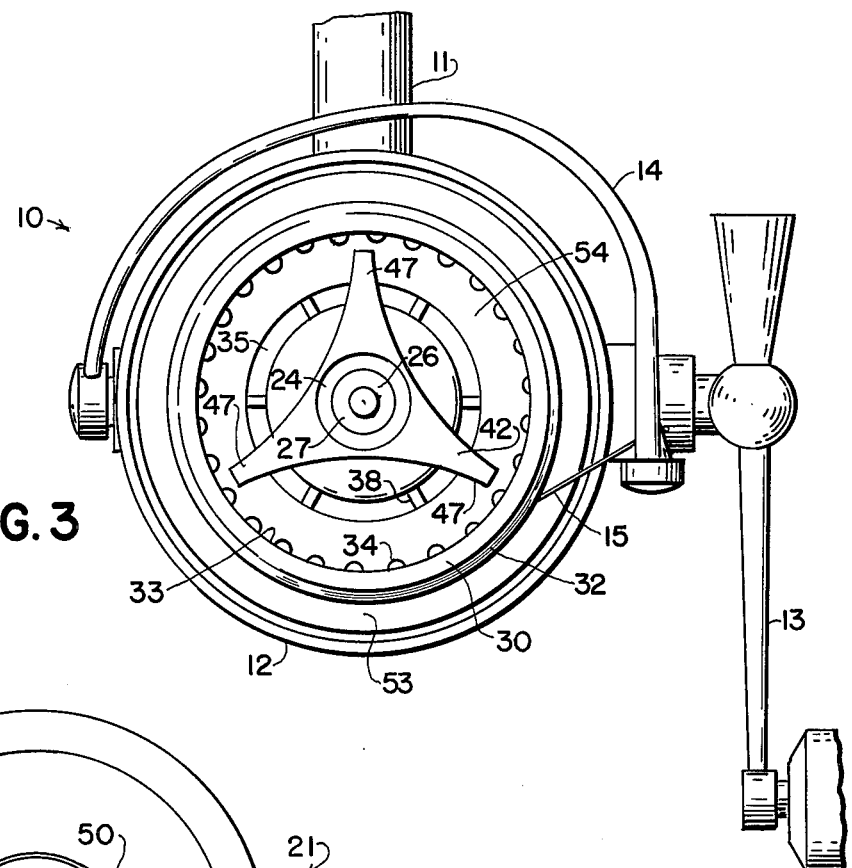
FIG. 3 is a front view of a spinning reel with its foot and crank handle partially broken away showing a spindle adapter and symmetrical spool mounted thereon.

As shown in FIG. 3, a conventional spinning reel, generally designated by the reference numeral 10, has a foot 11 which is fixed to a rod. Foot 11 is formed integrally with a gear housing (not shown) to the front end of which the cylindrical cup shaped bail carrier 12 is attached. By turning crank 13, bail carrier 12 and the attached bail 14 may be rotated to wind line 15. Bail 14 may be swung aside to allow line 15 to pull free as during casting.

Figures 1, 2:
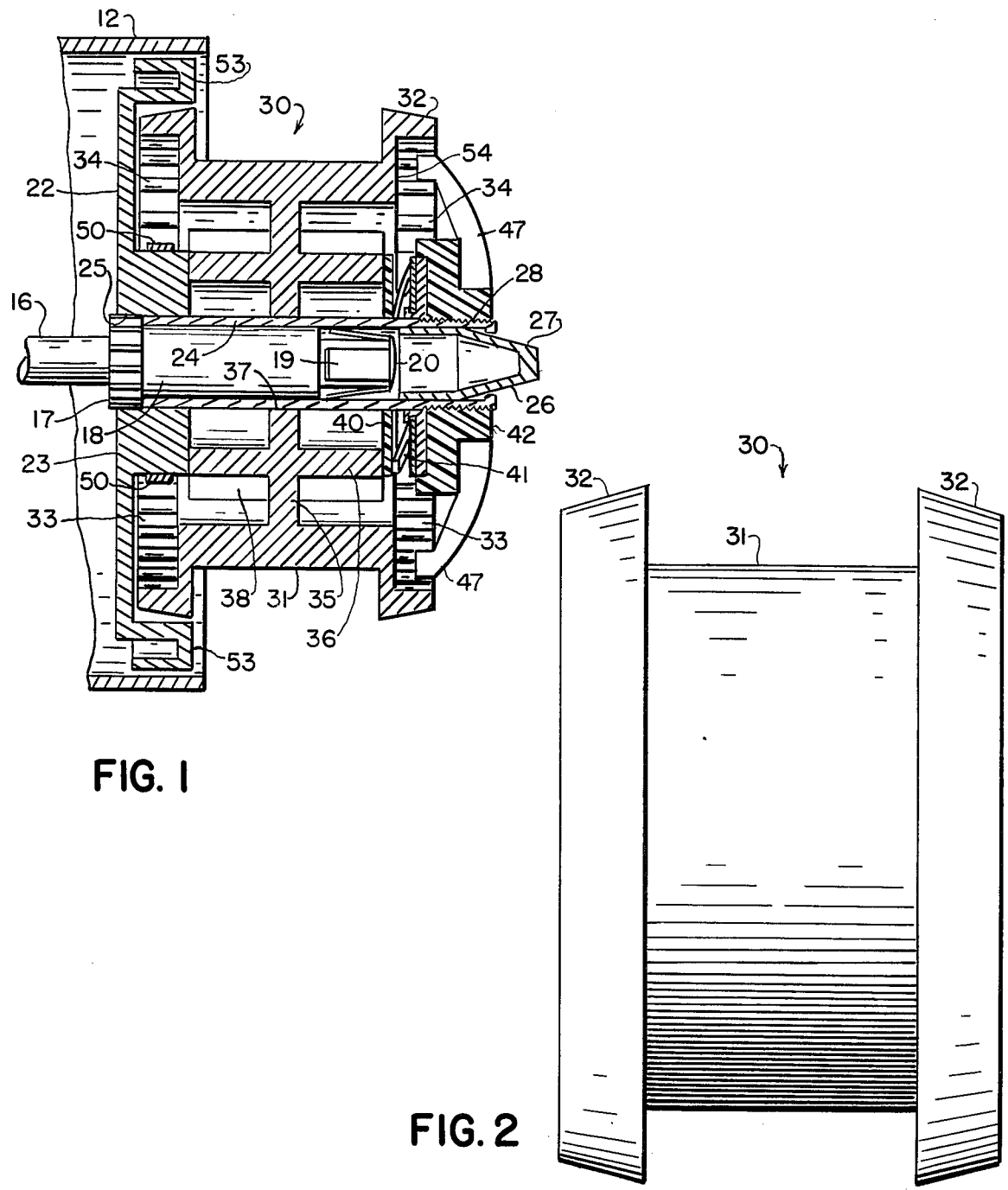
FIG. 1 is a longitudinal section through broken away front fragments of a bail carrier and spindle and through a spindle adapter and a longitudinally symmetrical spool mounted on the spindle.
FIG. 2 is a side view of a longitudinally symmetrical spool according to this invention.

As is further shown in FIG. 1, spindle 16 reciprocates longitudinally inward and outward to evenly wind line 15 as bail carrier 12 and bail 14 rotate. The rear portion of spindle 16 has a toothed portion 17 from which there extends forward a larger diameter portion 18. In front of portion 18, rearwardly extending spring clips 19 are fixed to the front end 20 of spindle 16. All the foregoing elements are well-known in the art and are incorporated in the MITCHELL 300 reel.

Figure 4:
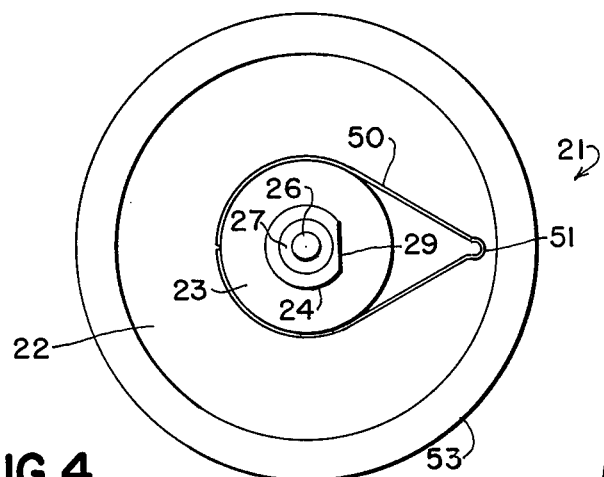
FIG. 4 is a front view of the spindle adapter.

Referring now to FIGS. 1 and 4, the spindle adapter 21 of this invention has a base 22 with a thick central boss 23. A tubular shaft 24 extends forward from boss 23 and is adapted to slide rearwardly over the larger diameter portion 18 of spindle 16. The rear of boss 23 contains a cavity 25 which conforms to the toothed portion 17 and receives it to prevent rotation of spindle adapter 21 relative to spindle 16. The front end of tubular shaft 24 has its inner surface engaged by the spring clips 19 to hold the adapter 21 on spindle 16. A hollow release button 25 is slidably disposed in the front end of tubular shaft 24. When the frusto-conical front end 27 of button 26 is pushed, it slides rearwardly to disengage the spring clips 19 and allow removal of spindle adapter 16. The front outer surface 28 of tubular shaft 24 is threaded and has a longitudinal flattened portion 29.

Figure 5:
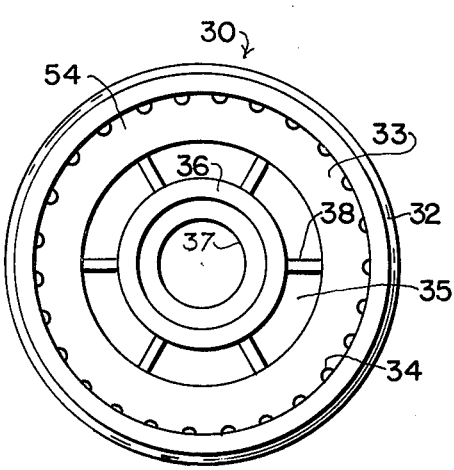
FIG. 5 is an end view of the longitudinally symmetrical spool of this invention.

As shown in FIGS. 1, 2 and 5, a longitudinally symmetrical spool 30 according to this invention has a cylindrical central body 31 with two larger diameter sloping shoulders 32 formed at each end. A shallow cavity 33 is formed in each end of spool 30 with teeth 34 of rounded section spaced about its inward facing edge. From a central transverse web 35, a cylindrical spacer 36 is integrally formed within spool 30. Radial reinforcing spokes 38 may extend from spacer 36 to the central body 31. Web 35 contains a central opening 37 to fit about the tubular shaft 24 of the spindle adapter.

Referring again to FIGS. 1 and 3, when spindle adapter 21 is placed over spindle 16, spool 30 may be slipped over shaft 24 as shown. A fiber friction washer 40, a spring washer 41, and a nut 42 hold spool 30 in place.

Figure 6:
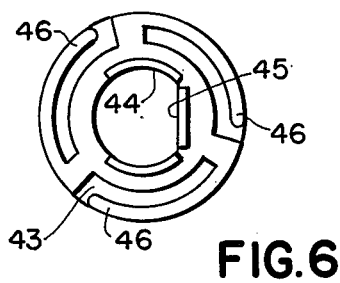
FIG. 6 is a front view of a spring washer used with the spindle adapter of this invention.

As shown in FIG. 6, spring washer 41 has a disk portion 43 containing a central opening 44 with a flat side 45. Flat side 45 engages the flattened portion 29 of shaft 24 so that spring washer 41 cannot rotate thereon. Fingers 46 of spring steel enable spring washer 41 to exert an axial thrust. Thus, as may be seen in FIGS. 1 and 3, when nut 42 with its three easily grasped arms 47 is tightened, spacer 36 of spool 30 is adjustably clamped between boss 22 and fiber washer 40 to restrict its rotation.

As shown in FIGS. 1 and 4, a click spring 50 is fixed about boss 22 and terminates in a rounded outwardly extending loop 51. When a spool 30 is placed on a spindle adapter 21 and rotated relative thereto, loop 51 engages the teeth 34 on the rearward side of the spool to click and indicate such rotation. Spindle adapter 21 has an outer forwardly extending flange 53 which surrounds the rearmost shoulder 32 and substantially fills the space between the rearmost shoulder 32 and the bail carrier 12 to prevent the entrance of line therein and any consequent fouling.

When line 15 is wound on a spool 30, the sides 54 of the spool can be marked to indicate which way the spool should be inserted for right hand use and which way for left hand use. In this connection, one side 54 could be marked green to be disposed forward for use in right hand reels and the other side 54 could be marked red to be disposed forward for use in left hand reels.

Since spindle adapters 21 with spools 30 can be changed faster than spools 30 alone by merely depressing button 26, a fisherman may wish to stock two or more spindle adapters for use with a large number of pre-wound spools 30. The spools 30 may be cast of a light metal, molded of plastic, or otherwise fabricated. The spindle adapter 21 may be made entirely of metal or it may have some elements molded from plastic.

I claim:

1. For use with a spinning reel having a spindle, a rotatable bail carrier disposed about said spindle, and a bail on said bail carrier to engage and wind line, a disengageable spindle adapter having a longitudinally symmetrical spool removably mounted thereon comprising, in combination, a spindle adapter having a tubular shaft sized to slide over the spindle of said reel, a base extending laterally outward from said tubular shaft, means fixing said tubular shaft against rotation about said spindle, and means disengageably securing said tubular shaft on said spindle, said tubular shaft having a forwardly disposed threaded end remote from said base; a longitudinally symmetrical spool having line pre-wound thereon, a cylindrical body and two larger diameter shoulders at the ends of said body, said body containing a central opening to receive the tubular shaft of said spindle adapter; a peripheral, forwardly extending flange on said base of said spindle adapter and surrounding the rearwardly disposed shoulder of said spool to substantially fill the annular space between the rearwardly disposed shoulder of said spool and said bail carrier; a nut turned about the threaded end of said tubular shaft to adjustably resist rotation, said longitudinally symmetrical spool being reversible on said adapter to accomodate right and left hand reels; and click means to indicate rotation of said spool about said spindle said clicking means comprises annular teeth on the ends of said spool and a spring member mounted on said adapter engaging the annular teeth on the rearwardly disposed end of said spool.

2. The combination according to claim 1 wherein the ends of said spool contain shallow cavities each having an inward facing rim, said annular teeth being disposed to project inward from said inward facing rims, said spring member being mounted on said spindle adapter to extend laterally and having an outwardly extending loop to engage said teeth.

3. The combination according to claim 1 wherein said means fixing said base and said tubular shaft against rotation comprises a toothed portion of said spindle, said base of said spindle adapter containing a cavity conforming to said toothed portion of said spindle, said toothed portion entering said cavity fixing said spindle adapter against rotation on said spindle.

4. The combination according to claim 3 wherein the front outer surface of said tubular shaft contains a longitudinal flattened portion and with the addition of a spring washer containing a central opening with a flat side engaging said flattened portion of said tubular shaft preventing rotation of said spring washer about said tubular shaft, said spring washer being clamped between said nut and said spool exerting an axial thrust on said spool.

5. The combination according to claim 4 wherein said spool contains a central transverse web containing said central opening, and with the addition of a cylindrical spacer extending longitudinally from said web about said central opening, said base having a central boss, said cylindrical spacer of said spool being clamped between said boss and said spring washer.

6. The combination according to claim 5 wherein said shoulders of said spool have inward sloping outer surfaces.

* * * * *